Feb. 27, 1968 R. L. LUCAS ETAL 3,370,401
PROCESS AND APPARATUS FOR WET SCRUB REMOVAL
OF DUST AND MIST FROM GASES
Filed Feb. 1, 1967 3 Sheets-Sheet 1
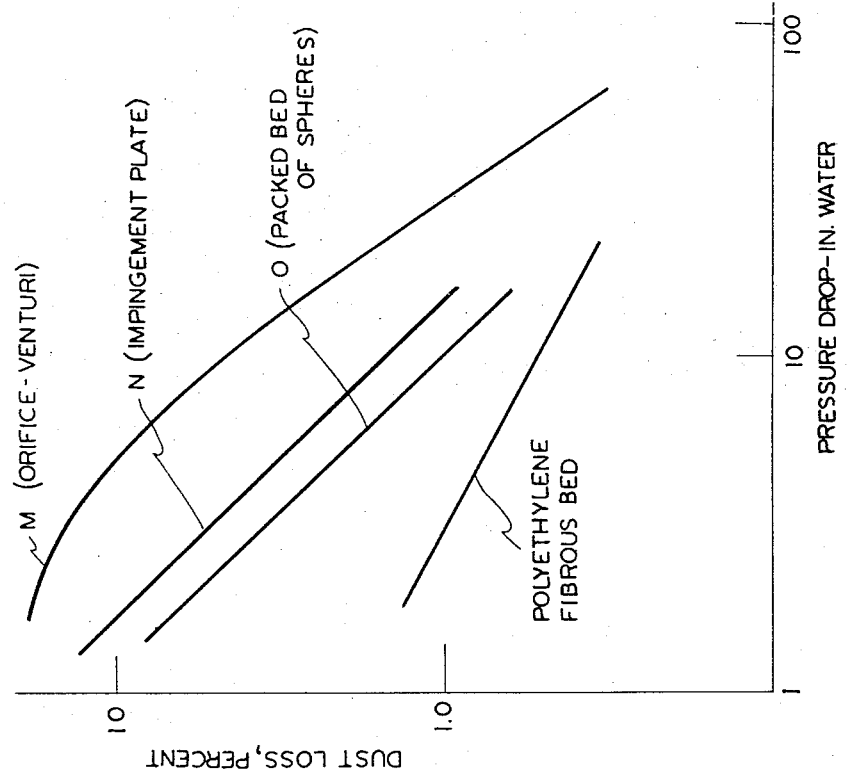
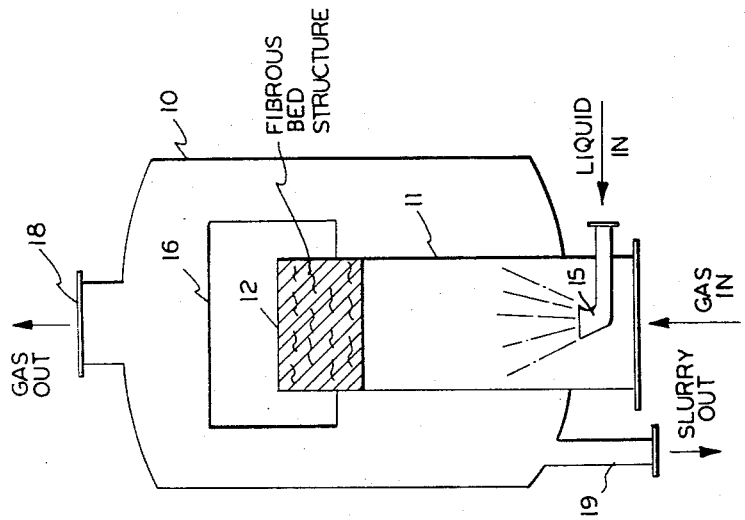
INVENTORS
HAROLD F. PORTER
ROBERT L. LUCAS
BY Harry J. McCauley
ATTORNEY Feb. 27, 1968   R. L. LUCAS ETAL   3,370,401
PROCESS AND APPARATUS FOR WET SCRUB REMOVAL
OF DUST AND MIST FROM GASES
Filed Feb. 1, 1967   3 Sheets-Sheet 2

G = SUPERFICIAL MASS VELOCITY OF GAS - lb/(SEC.)(FT.$^2$)
$g_c$ = GRAVITATIONAL CONSTANT - (lb)(FT.)/SEC.$^2$(lb. FORCE)
L = SUPERFICIAL MASS LIQUID VELOCITY - lb/(SEC.)(FT.$^2$)
S = SURFACE AREA PACKING - SQ.FT./FT.$^3$
$V_o$ = SUPERFICIAL GAS VELOCITY - FT./SEC.
E = VOID FRACTION OF STRUCTURE - DIMENSIONLESS
$\mu_L$ = LIQUID VISCOSITY - CENTIPOISE
$\rho$ = GAS DENSITY - lb/FT.$^3$
$\rho_L$ = LIQUID DENSITY - lb/FT.$^3$

| PLOTTED RUN COORDINATES | | |
|---|---|---|
| RUN NO. | ORDINATE | ABSCISSA |
| 42 | 0.791 | 0.157 |
| 46 | 0.790 | 0.171 |
| 51 | 0.791 | 0.171 |
| 55 | 0.598 | 0.071 |
| 56 | 1.063 | 0.054 |
| 64 | 0.657 | 0.071 |

FLOODING VELOCITY, FIBROUS BED STRUCTURES

Ordinate: $\dfrac{V_o^2 S \rho \mu_L^{0.2}}{g_c E^3 \rho_L}$

Abscissa: $\dfrac{L}{G}\left(\dfrac{\rho}{\rho_L}\right)^{1/2}$

FIG. 3

INVENTORS
HAROLD F. PORTER
ROBERT L. LUCAS

BY  Harry J. McCauley
ATTORNEY

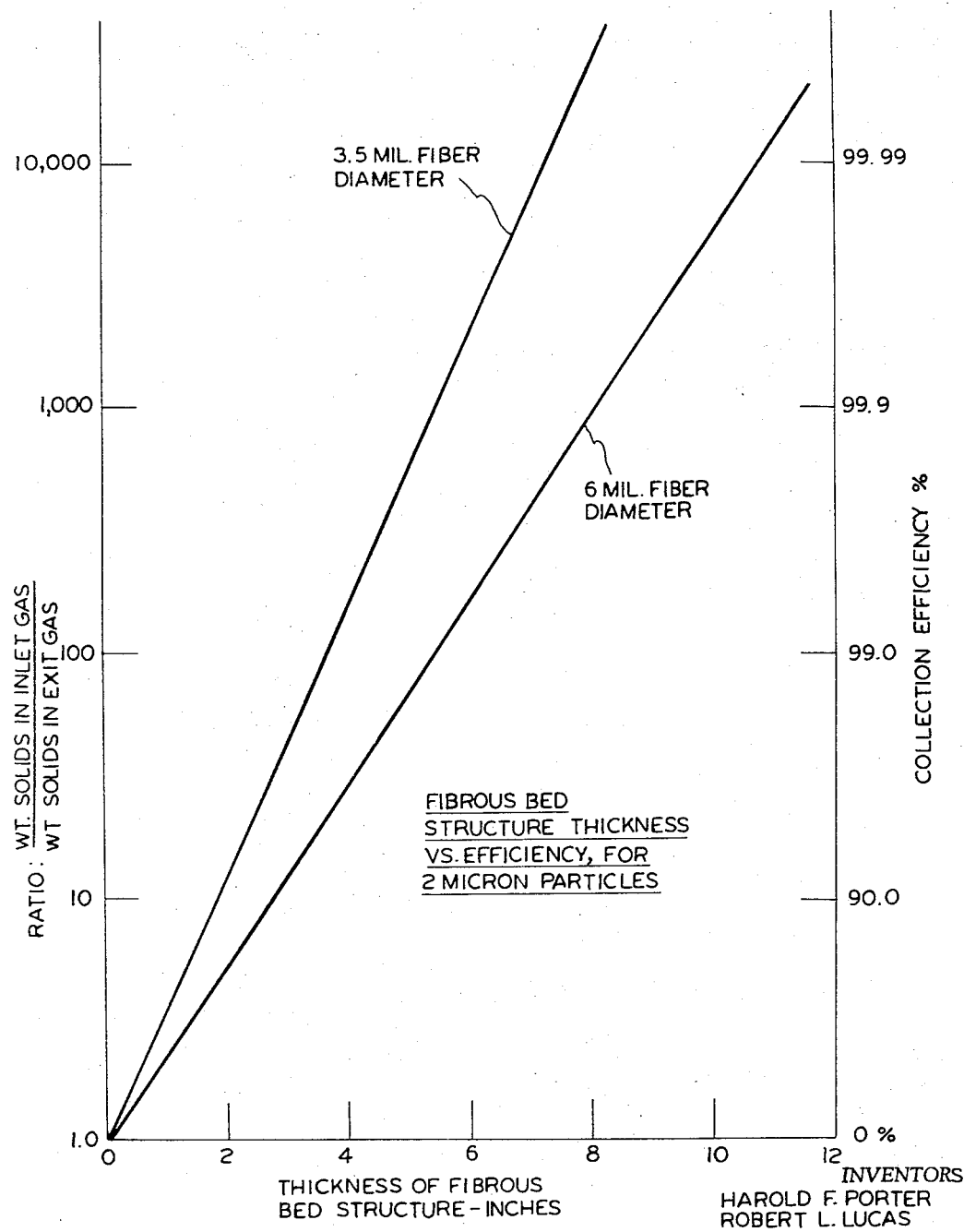

United States Patent Office 3,370,401
Patented Feb. 27, 1968

3,370,401
PROCESS AND APPARATUS FOR WET SCRUB REMOVAL OF DUST AND MIST FROM GASES
Robert L. Lucas, Newark, and Harold F. Porter, Hockessin, Del., assignors to E. I. du Pont de Nemours and Company, Wilmington, Del., a corporation of Delaware
Continuation-in-part of application Ser. No. 371,261, June 1, 1964. This application Feb. 1, 1967, Ser. No. 613,324
2 Claims. (Cl. 55—90)

ABSTRACT OF THE DISCLOSURE

Process and apparatus for web scrub removal of dust and mist from gases in which the polluted gas is sprayed with a liquid in which the dust is relatively insoluble, the gas and liquid are then passed at a velocity in excess of the flooding velocity through a fibrous bed structure of pore size sufficiently fine and length of path sufficiently long to thoroughly contact the dust and mist with the liquid, and the dust and mist are separated as a liquid slurry, while the cleansed gas is withdrawn as a separate fraction.

Cross reference to related applications

This application is a continuation-in-part of U.S. application Ser. No. 371,261 filed June 1, 1964, now abandoned in the names of the same applicants as joint inventors.

Brief summary of the invention

Generally, this invention comprises a method of removing fine particulate solids and mist entrained in a gas stream comprising, in sequence, spraying the gas stream with a liquid in which said particulate solids are relatively insoluble, passing the gas-liquid mixture at a velocity in excess of the flooding velocity through a fibrous bed structure having a pore size sufficiently fine and a length of path sufficiently long to thoroughly contact the gas stream containing the particulate solids and mist with the liquid, and separating as a first fraction a slurry of particulate solids containing the mist in the liquid and as a second fraction cleansed gas substantially free of solids, mist and liquid droplets, together with apparatus for carrying out the method.

Drawings

The construction of apparatus according to the invention and the manner in which it operates are detailed in the drawings, in which:

FIG. 1 is a schematic sectional side elevation of a preferred apparatus embodiment, FIG. 2 is a comparative log-log plot of Per Cent Dust Loss versus Pressure Drop in Inches of Water for this invention and three existing methods of the prior art, FIG. 3 is a log-log plot of flooding velocity as a function of the independent variables determinative thereof, and FIG. 4 is a semi-log plot of Fibrous Bed Structure Thickness vs. Dust Collection Efficiency for fibrous bed structures made up of 3.5 mil and 6 mil thick fibers, respectively.

Detailed description

Referring to FIG. 1, a preferred embodiment of apparatus comprises a vertical cylindrical housing 10 provided with a concentrically disposed gas supply conduit 11 carrying within its discharge end a plug of fibrous bed structure 12 disposed transverse the conduit. At least two conduit diameters upstream from the fibrous bed structure 12 is a concentrically disposed liquid spray nozzle 15 oriented to discharge its liquid substantially evenly over the gas passed through conduit 11. Disposed approximately one conduit 11 radius above the gas exit side of fibrous bed structure 12 is an inverted cylindrical cap 16 having a depth approximately one conduit 11 diameter, so that its rim overhangs the end of conduit 11, with its emplaced fibrous bed structure, approximately one conduit 11 radius.

The upper end of housing 10 is provided with the cleansed gas exit port 18, whereas offside port 19 in the bottom of housing 10 is reserved to solid-liquid slurry withdrawal.

The following relative proportions of equipment components have proved especially effective, it being understood, however, that these constitute no critical limitations and that individual dimensions can in fact be varied widely without affecting the operation deleteriously: Where D=diameter of conduit 11, housing 10 can have a diameter of 2.5D and a height from lower dished head juncture with the cylindrical side wall to upper dished head juncture of 3.0D, with the opening of conduit 11 disposed at a level of 2.0D above the lower dished head juncture.

It is important that there be even distribution of scrubbing liquid across the entire cross-section of conduit 11, and this can be readily achieved by using one or more solid cone spray nozzles 15 of the non-clogging type.

Entrained solids and mist removal according to this invention depends upon contacting the entraining gas stream intimately with a liquid and, thereafter, collecting the liquid-solid slurry from the effluent gas stream. Traverse of a relatively fine fibrous bed structure is essential to intimate liquid-solid contacting, especially in an accompanying gas stream, however, rapid clogging of the meshes with solids occurs unless the gas velocity is kept well above the flooding velocity for the particular fibrous bed-solids-liquid system utilized. The problem of clogging is particularly serious where, as with this invention, the particulate solids to be separated are relatively insoluble in the scrubbing liquid.

Fibrous bed structures of a great variety of constructions are suitable for the purposes of this invention; however, knitted structures are particularly preferred, because of the uniformity of flow characteristics which it is possible to readily obtain by this fabrication. Similarly, the materials of construction are of wide choice, thereby making it possible to employ those which have exceptional resistance to chemical corrosion, or erosion by the gases, liquids and solids in process.

For example, S.A.E. Type 304 stainless steel, polyethylene and polytetrafluoroethylene have all given good results as fibrous bed structure materials.

The knitting practice can be entirely conventional, the cardigan stitch being preferred, but other stitches, such as the half-cardigan, cable and the like being equally suitable. Overall fiber diameters ranging from 0.5 mil to 16 mils, or even thicker, proved satisfactory, both as monofilaments and also as multifilaments. The preferred range of mesh sizes for the knitted material was quite broad, extending from about 1/64" to about 1/4".

Both circular and flat bed knitting machines can be employed, the circular type product, which is sleeve-like in form as received from the knitting machine, being preferably flattened to double thickness and then crimped along diagonal lines ¼" apart to bond the two thicknesses at, typically, ⅜" spacings, thereby imparting a somewhat bulked, quilt-like freeness normal to the thickness of the knitted material, which resists excessive compaction under the impact of the liquid-gas stream in transit therethrough.

It is convenient to make up circularly shaped fibrous bed structure by simply winding a length of the knitted material upon itself in a continuous spiral, and then cutting it to the thickness desired for plug 11 (typically 4"), whereupon the direction of gas-liquid flow therethrough is end-on, or parallel to the axis of roll-up. Alternatively, a number of layers of the knitted material may be cut to any desired common size and shape and stacked in a pile to make up the fibrous bed structure, both the polymeric materials and the metals being sufficiently stiff so that the double thickness knit goods springs apart to give an open fabrication with relatively low resistance to gas throughput, as will be understood when it is considered that only thirty-six double layers of 4 mil polyethylene has an uncompressed thickness of approximately 4".

Because of the variety of constructions and random layer-to-layer placements which fibrous bed structures can take, the most reliable indices for comparison are believed to be the total calculated specific surface of the strand material utilized in making up a specific volume, the packing density and the fraction of voids present in a cross-section opposed to the gas-liquid flow. The following is a tabulation of these characteristics for typical knitted structures which have given good service in dust separation tests:

| Mesh Material | Fiber Diameter (in.) | Packing Density (lb./cu. ft.) | Strand Specific Surface (sq. ft./cu. ft.) | Void Fraction |
| --- | --- | --- | --- | --- |
| Metal wire | 0.011 | 12.0 | 120 | 0.973 |
| Do | 0.011 | 9.0 | 90 | 0.981 |
| Do | 0.011 | 5.0 | 50 | 0.990 |
| Do | 0.006 | 8.0 | 140 | 0.983 |
| Polytetrafluoroethylene | 0.011 | 4.0 | 121 | 0.972 |
| Polyethylene | 0.012 | 2.0 | 133 | 0.967 |
|  | 0.0145 | 2.5 | 138 | 0.958 |
| Polypropylene | 0.012 | 2.5 | 178 | 0.956 |

In general, fibrous bed structures which have a packing density of about 1–20 lbs./ft.$^3$, a void fraction of about 80–99% and a specific surface of about 50 ft.$^2$/ft.$^3$ or greater give good dust separation efficiency. The specific fiber arrangement appears to be of secondary importance and, thus, knitted structures, random packed fibers, woven fabrics, multiple layers of screens, or combinations of two or more of any of these are all satisfactory for the purposes.

In operation, scrubbing liquid supply rates can be varied over relatively wide ranges, rates increasing from 3 g.p.m./ft.$^2$ to 60 g.p.m./ft.$^2$ of fibrous bed structure cross-sectional area having no appreciable effect on particulate solids separation efficiency, which remained very high. On the basis of gas throughputs, apparatus of this invention operated successfully at scrubbing liquid supply rates of 1.0 gal./1000 ft.$^3$ of gas to 100 gals./1000 ft.$^3$ of gas containing 10 grains of dust of the general analysis hereinafter detailed per cubic foot of entraining gas. At higher liquid supply rates, dust loadings in excess of 200 grains/ft.$^3$ were satisfactorily scrubbed out.

The scrubbing liquid can be supplied either fresh or recycled repeatedly through the apparatus, it being preferred to use the recycled slurry, because it is thereby possible to obtain a concentrated fraction of recovered solids for either return to the process, marketing in slurry form, or more convenient disposal as waste by virtue of its concentrated volume. The ultimate concentration of the slurry depends on the character of the solids involved; however, for the talc dust hereinafter described, continued scrubbing with slurries containing as high as 12% solids content was accompanied by no difficulties. In fact, comparative tests shown that the slurry appeared to have a slightly higher solids scrub removal efficiency than clear liquid.

It is essential that the gas-liquid throughput past the fibrous bed structure 12 be in excess of the flooding velocity, which is defined by T. K. Sherwood and associates in Industrial and Engineering Chemistry, vol. 30 (1938), pages 765–769. "Flooding" entails the more or less complete and vigorous rapid expulsion of liquid from the filter structure along with the gas throughput. If the flooding velocity is not exceeded, solids will collect in the interstices, rapidly blinding the bed structure to further gas-liquid passage.

FIG. 3 constitutes a convenient plot of the flooding velocity in terms of $$L/G\left(\frac{\rho}{\rho_L}\right)^{1/2}$$

as abscissa against $$\frac{V_o^2 S \rho \mu L^{0.2}}{g_c E^3 \rho_L}$$

as ordinate where:

$G$ = the superficial mass velocity of the gas in lbs./(sec.) (ft.$^2$)
$g$ = the gravitational constant in (lb.) (ft.)/sec.$^2$ (lb. force)
$L$ = the superficial mass liquid velocity in lb./(sec.) (ft.$^2$)
$S$ = the surface area packing in sq. ft./ft.$^3$
$V_o$ = the superficial gas velocity in ft./sec.
$E$ = the void fraction of the structure-dimensionless
$\mu$ = the liquid viscosity in centipoises
$\rho$ = the gas density in lb./ft.$^3$
$\rho_L$ = the liquid density in lbs./ft.$^3$ From the foregoing, it will be seen that the flooding velocity depends upon the characteristics of the fibrous bed structure employed and also on the materials being processed, as well as the rates at which processing is effected. The relationship is a complex one but good operation is obtained whenever functioning is above the curve plot of FIG. 3, which can be assured by a few check readings of the parameters which can be varied, for example, the superficial gas velocity, followed by appropriate adjustment to bring operation into the region above the flooding velocity plot line.

The following operating tests were conducted in an apparatus employing a 4" dia. conduit 11, an exiting liquid slurry impingement cap 16 of 8" dia. and a vessel 10 dia. of 12". The entrained particulate solid employed was water-insoluble talc dust having an average particle size of about 2 microns, 80% of the material being finer than 10 microns. The cumulative percentage sieve analysis showed that 50% was finer than 2.4 microns, 28% was finer than one micron and 14% was finer than 0.5 micron particle size. The standard test duration was 20 minutes; however, Runs 46 and 51 were each of 3 hours duration. In none of the runs was there any sign of plugging of the fibrous bed structures.

In all of the tests knitted fibrous bed structures 12 measuring 4" in dia. were employed, these being mounted transverse gas supply conduit 11 as shown in FIG. 1, with an overall thickness in the direction of gas flow of 4" in all instances, except as regards Runs 51 and 53, marked with asterisks, where the thickness was 8". The fibrous bed structure in Test Series A was of knitted polyethylene, 16 mils fiber diameter, whereas Series B was ASAE 304 stainless steel 11 mils fiber diameter and Series C ASAE 304 stainless steel, 6 mils fiber diameter.

The remaining test data were as follows:

SERIES A

Runs 40–44, density of fibrous bed structure ∓4 lbs./ ft.³; temperature of air-dust mixture 16° C.; rate of spray liquid supply 22 g.p.m./ft.² transverse conduit 11 cross-section:

| Run No. | Gas Through-put, ft.³/min. | Superficial Gas Velocity Through Fibrous Bed Structure, ft./sec. | Gas Dust Contamination of Input, gr./'t. | Pressure Drop, Inches H₂O | Percent Dust Collection Efficiency |
|---|---|---|---|---|---|
| 40 | 178 | 34 | 13 | 11.3 | 98.9 |
| 41 | 208 | 40 | 14 | 13.7 | 98.7 |
| 42 | 46 | 9 | 5 | 2.9 | 97.7 |
| 43 | 65 | 12 | 11 | 3.4 | 98.44 |
| 44 | 80 | 15 | 16 | 4.5 | 99.2 |

*Run 46–48.*—Rate of liquid supply, 24 g.p.m./ft.² transverse conduit 11 cross-section.
*Test Temp.*—Run 46, 12° C.; Test 47, 13° C.; Test 48, 6° C.

| Run No. | Gas Through-put, ft.³/min. | Superficial Gas Velocity Through Fibrous Bed Structure, ft./sec. | Gas Dust Contamination of Input, gr./ft.³ | Pressure Drop, Inches H₂O | Percent Dust Collection Efficiency |
|---|---|---|---|---|---|
| 46 | 48 | 9 | 28 | 4.3 | 99.75 |
| 47 | 94 | 18 | 19 | 8.1 | 98.85 |
| 48 | 173 | 33 | 14 | 13.2 | 98.99 |

Runs 51 and 53, rate of liquid supply 24 and 25 g.p.m./ft.² conduit 11 transverse cross-section, respectively; test temperature 12° C. and 15° C., respectively.

| Run No. | Gas Through-put, ft.³/min. | Superficial Gas Velocity Through Fibrous Bed Structure, ft./sec. | Gas Dust Contamination of Input, gr./ft.³ | Pressure Drop, Inches H₂O | Percent Dust Collection Efficiency |
|---|---|---|---|---|---|
| 51* | 48 | 9 | 65 | 9.0 | 99.44 |
| 53* | 92 | 18 | 45 | 19.0 | 99.58 |

SERIES B

Runs 55 and 56, density of fibrous bed structure, 20 lbs./ft.³; test temperature 15 and 17° C., respectively; rate of liquid supply 10 g.p.m./ft.² transverse conduit 11 cross-section.

| Run No. | Gas Through-put, ft.³/min. | Superficial Gas Velocity Through Fibrous Bed Structure, ft./sec. | Gas Dust Contamination of Input, gr./ft.³ | Pressure Drop, Inches H₂O | Percent Dust Collection Efficiency |
|---|---|---|---|---|---|
| 55 | 131 | 9 | 37 | 3.7 | 98.8 |
| 56 | 180 | 12 | 37 | 4.8 | 98.5 |

SERIES C

Runs 58 and 59: density of fibrous bed structure=40 lbs./ft.³; test temperature 17° C.; rate of liquid supply, 10 g.p.m./ft.² conduit 11 transverse cross-section.

| Run No. | Gas Through-put, ft.³/min. | Superficial Gas Velocity Through Fibrous Bed Structure, ft./sec. | Gas Dust Contamination of Input, gr./ft.³ | Pressure Drop, Inches H₂O | Percent Dust Collection Efficiency |
|---|---|---|---|---|---|
| 58 | 145 | 10 | 28 | 9.6 | 98.6 |
| 59 | 177 | 12 | 36 | 9.9 | 98.9 |

Runs 64 and 65: density of fibrous bed structure, 12 lbs./ft.³; test temperatures 13° C. and 16° C., respectively; rate of liquid supply 10 g.p.m./ft.² conduit 11 transverse cross-section.

| Run No. | Gas Through-put, ft.³/min. | Superficial Gas Velocity Through Fibrous Bed Structure, ft./sec. | Gas Dust Contamination of Input, gr./ft.³ | Pressure Drop, Inches H₂O | Percent Dust Collection Efficiency |
|---|---|---|---|---|---|
| 64 | 137 | 9 | 22 | 10.7 | 99.88 |
| 65 | 175 | 12 | 27 | 10.3 | 98.7 |

From the foregoing, it will be seen that an exceedingly high dust collection efficiency is attained in all cases, with an accompanying relatively low pressure drop. Moreover, the test durations were sufficiently long, i.e., 20 minutes to 3 hours, so that complete assurance against clogging was obtained.

The FIG. 3 ordinate and abscissa values corresponding to the individual Run Nos. hereinabove set forth are tabulated as follows, only the six runs lying nearest to the critical flooding velocity line being plotted as individual points identified by their respective Run Nos. on the figure:

| Run No. | Ordinate | Abscissa | Run No. | Ordinate | Abscissa |
|---|---|---|---|---|---|
| 40 | 11.28 | 0.042 | 51 | 0.791 | 0.171 |
| 41 | 15.62 | 0.035 | 53 | 3.163 | 0.089 |
| 42 | 0.791 | 0.157 | 55 | 0.598 | 0.071 |
| 43 | 1.41 | 0.118 | 56 | 1.064 | 0.054 |
| 44 | 2.20 | 0.094 | 58 | 3.067 | 0.064 |
| 46 | 0.791 | 0.171 | 59 | 4.416 | 0.054 |
| 47 | 3.163 | 0.086 | 64 | 0.657 | 0.071 |
| 48 | 10.63 | 0.047 | 65 | 1.169 | 0.054 |

Yet other tests conducted with water-insoluble titanium dioxide of 100% less than 5 microns size as the entrained solids showed results substantially the same as for the talc.

Referring to FIG. 4, smaller diameter fibers have proved more efficient on an equal weight per unit volume basis than larger diameter fibers, probably because the increased length of the former makes the gas-liquid path through the fibrous bed structure more serpentine. Thus, in a series of tests on air-entrained 2 micron average particle size talc, improved separating efficiencies were obtained per inch of fibrous bed structure thickness with 3.5 mil fiber diameter over those with 6 mil fiber diameter. The material of fabrication was ASAE 304 stainless steel in knitted form (mesh size about 3/16" on a side), but uncrimped, with the following characteristics:

| Fiber | Packing Density (lbs./ft.³) | Specific Surface (sq. ft./ft.³) | Void Fraction |
|---|---|---|---|
| 3.5 mil | 8 | 280 | 0.983 |
| 6 mil | 8 | 140 | 0.983 |

The comparative performance of the apparatus of this invention as opposed to three conventional types of scrubber apparatus employed in particulate solids removal from gas streams is shown in FIG. 2. The same 2 micron average particle size water-insoluble dust hereinbefore described was employed in air entrainment as the test medium, at air flows ranging from about 124 ft.³/min. to 532 ft.³/min. (referred to 70° F., one atmosphere pressure) at dust loadings ranging from about 3.43 grains/ft.³ to 24.9 grains/ft.³ and scrubber water supply rates ranging from 5.33 gal./1000 ft.³ of air throughput to 41.6 gal./1000 ft.³, the higher water supplies of 31 to 41.6 gal./1000 ft.³ being required to avoid plugging of the impingement plate apparatus having the performance plotted along line N. In these tests water supply rates of about 10 gal./1000 ft.³ of air were employed for the fibrous bed scrubber of this invention.

It is apparent from FIG. 2 that orifice-venturi types scrubbers with characteristics along plot M were the least efficient in terms of dust loss of all the conventional apparatus tested. Impingement plates (plot N) and packed sphere beds (5" thickness of 5/8" diameter marbles, plot 0) came next in order of increasing efficiency, but all were surpassed by the fibrous bed structure scrubbers of this invention.

It will be understood that other types of liquid separators can be employed to free the exiting gas from the fibrous bed structures of its accompanying water-solids slurry, including conventional cyclone separators and the like. However, water impingement against a solid plate with deflection sharply away from the general direction of gas flow through the bed structures is highly compact, economical and entirely satisfactory, so that it is preferred. Also, it is not absolutely necessary that conduit 11 be aligned vertically, and other inclinations are practicable; however, more even scrubbing is thereby attained and vertical arrangement is therefore preferred.

From the foregoing, it will be understood that this invention can be modified in numerous respects without departure from its essential spirit, and it is therefore intended to be limited only within the scope of the appended claims.

What is claimed is:

1. A method for removing fine particulate solids and mist entrained in a gas stream comprising, in sequence, spraying said gas stream with a liquid in which said particulate solids are relatively insoluble, passing the gas-liquid mixture in a generally upward direction at a velocity in excess of the flooding velocity through a fibrous bed structure having a pore size sufficiently fine and a length of path sufficiently long to thoroughly contact said gas stream containing said particulate solids and mist with said liquid, and impinging effluent solid-liquid mixture exiting from said fibrous bed structure against an impervious surface redirecting the flow of a first fraction consisting of a slurry of particulate solids containing said mist in said liquid in a direction sharply away from that taken by said gas-liquid mixture through said fibrous bed structure while exhausting as a second fraction cleansed gas substantially free of solids by discharge in a direction in general prolongation with the course of said gas-liquid mixture through said fibrous bed structure.

2. Apparatus for removing fine particulate solids and mist entrained in a gas stream comprising, in combination, a housing fitted at the bottom with an upwardly directed gas supply conduit discharging into said housing, said gas supply conduit being provided with a scrubbing liquid spray nozzle discharging a liquid in which said particulate solids are relatively insoluble substantially evenly across the cross-section of said conduit, a fibrous bed structure disposed transverse the open discharge end of said conduit fabricated from fibers having diameters in the range of about 0.5 mil to 16 mils, said fibrous bed structure having a packing density of about one to 20 lbs./ft.$^3$, a specific surface in excess of about 50 ft.$^2$/ft.$^3$ and a void fraction in the range of about 0.8 to about 0.99, means forcing said gas stream sprayed with said scrubbing liquid through said gas supply conduit and said fibrous bed structure at a velocity in excess of the flooding velocity of said fibrous bed structure, means comprising an impervious surface disposed above said fibrous bed structure redirecting the flow of a fraction consisting of a slurry of particulate solids containing said mist in said liquid in a direction sharply away from that taken by said gas stream and said scrubbing liquid through said fibrous bed structure and thence into a collection volume reserved for said fraction, and an open cleansed gas escape conduit in general prolongation with the course taken by said gas stream and said scrubbing liquid through said fibrous bed structure.

References Cited

UNITED STATES PATENTS

| 2,513,174 | 6/1950 | Hess | 55—90 |
| 2,601,519 | 6/1952 | Hardy et al. | 55—233 X |
| 2,933,154 | 4/1960 | Lauterbach | 55—97 |
| 3,130,024 | 4/1964 | Vaughan et al. | 55—257 X |
| 3,141,910 | 7/1964 | Pearce | 55—257 X |
| 3,250,059 | 5/1966 | Vosseler | 55—90 |

FOREIGN PATENTS

| 628,115 | 9/1961 | Canada. |
| 872,473 | 7/1961 | Great Britain. |

SAMIH N. ZAHARNA, *Primary Examiner.*

J. ADEE, *Assistant Examiner.*